(12) United States Patent
Liu (10) Patent No.: US 10,176,317 B2
(45) Date of Patent: Jan. 8, 2019

(54) METHOD AND APPARATUS FOR MANAGING SUPER USER PASSWORD ON SMART MOBILE TERMINAL (71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventor: Bin Liu, Beijing (CN)

(73) Assignee: Beijing Qihoo Technology Company Limited (CN)

(*) Notice: Subject to any disclaimer, the term of this patent is extended or adjusted under 35 U.S.C. 154(b) by 58 days.

(21) Appl. No.: 15/108,176

(22) PCT Filed: Aug. 26, 2014

(86) PCT No.: PCT/CN2014/085186
§ 371 (c)(1),
(2) Date: Jun. 24, 2016

(87) PCT Pub. No.: WO2015/096501
PCT Pub. Date: Jul. 2, 2015

(65) Prior Publication Data
US 2016/0321450 A1 Nov. 3, 2016

(30) Foreign Application Priority Data
Dec. 25, 2013 (CN) .......................... 2013 1 0728254

(51) Int. Cl.
G06F 7/04 (2006.01)
G06F 21/45 (2013.01)
(Continued)

(52) U.S. Cl.
CPC .............. G06F 21/45 (2013.01); G06F 21/31 (2013.01); G06F 21/46 (2013.01); G06F 21/602 (2013.01)

(58) Field of Classification Search
CPC ..... G06F 21/46; G06F 21/31; H04L 63/0846; H04L 29/06782
(Continued)

(56) References Cited

U.S. PATENT DOCUMENTS 6,690,400 B1 * 2/2004 Moayyad .............. G06F 3/0605
715/775
7,454,791 B1 * 11/2008 Godwin ................ G06F 21/577
726/25
(Continued)

FOREIGN PATENT DOCUMENTS

CN 1477890 2/2004
CN 1622509 6/2005
(Continued)

OTHER PUBLICATIONS

Das et al, A Dynamic ID-based Remote User Authentication Scheme, Apr. 13, 2004, IEEE, pp. 629-631.*
(Continued)

Primary Examiner — Luu T Pham
Assistant Examiner — Jenise E Jackson
(74) Attorney, Agent, or Firm — McDonnell Boehnen Hulbert & Berghoff LLP (57) ABSTRACT The present invention discloses a method and an apparatus for managing a super user password on a smart mobile terminal, wherein the method for managing the super user password on the smart mobile terminal comprises: obtaining a super user password that is used currently by a smart mobile terminal; determining whether the super user password that is used currently is a default super user password of the smart mobile terminal; and if yes, prompting a user to change the super user password or automatically changing the super user password. The method and apparatus provide a scheme for changing the default super user password of the (Continued)

smart mobile terminal. An operation is simple and quick. An attention of the user on the super user password increases. A super user password security risk existing on the smart mobile terminal currently is effectively eliminated. Security of smart mobile terminal user data is enhanced.

17 Claims, 2 Drawing Sheets

(51) Int. Cl.
  *G06F 21/46* (2013.01)
  *G06F 21/31* (2013.01)
  *G06F 21/60* (2013.01)

(58) Field of Classification Search
  USPC .......................................................... 726/18
  See application file for complete search history.

(56) References Cited

U.S. PATENT DOCUMENTS

| | | | | |
|---|---|---|---|---|
| 2001/0002487 | A1* | 5/2001 | Grawrock | G06F 21/31 713/193 |
| 2001/0027478 | A1* | 10/2001 | Meier | H04L 51/14 709/206 |
| 2003/0101360 | A1* | 5/2003 | Legros | G06F 21/31 726/6 |
| 2006/0265330 | A1* | 11/2006 | Fukasawa | G06F 21/6209 705/51 |
| 2007/0101065 | A1* | 5/2007 | Walker | G06Q 10/02 711/133 |
| 2008/0089517 | A1* | 4/2008 | Bianco | G06F 12/1466 380/259 |
| 2011/0107406 | A1 | 5/2011 | Frost et al. | |
| 2013/0219496 | A1* | 8/2013 | Nie | H04L 63/1433 726/22 |
| 2015/0134950 | A1* | 5/2015 | Colgrove | H04L 63/0846 713/155 |
| 2015/0227396 | A1* | 8/2015 | Nimmagadda | G06F 9/5077 718/1 |
| 2015/0295714 | A1* | 10/2015 | Liu | H04L 9/3226 713/183 |

FOREIGN PATENT DOCUMENTS

| | | |
|---|---|---|
| CN | 1805338 | 7/2006 |
| CN | 1946102 | 4/2007 |
| CN | 102750486 | 10/2012 |
| CN | 102957696 | 3/2013 |
| CN | 103297425 | 9/2013 |
| CN | 103745160 | 4/2014 |

OTHER PUBLICATIONS

Islam et al, Improved Remote Login Scheme based on ECC, 2011, IEEE, pp. 1221-1226.*
http://www.netzone.com/docs/basic-setup-password.html; Netzone Product Documentation; published May 9, 2012; retrieved Oct. 3, 2016. (Machine-translated version attached).
International Search Report and Written Opinion dated Nov. 25, 2014, issued in connection with International Patent Application No. PCT/CN2014/085186, filed on Aug. 26, 2014.

* cited by examiner

METHOD AND APPARATUS FOR MANAGING SUPER USER PASSWORD ON SMART MOBILE TERMINAL

CROSS REFERENCE TO RELATED APPLICATIONS

This disclosure a national stage entry of, and claims priority to, International Patent Application No. PCT/CN2014/085186 filed Aug. 26, 2014, which claims priority to Chinese Patent Application No. 201310728254.0 filed Dec. 25, 2013, both of which are hereby incorporated in their entirety herein by reference.

TECHNICAL FIELD

The present invention relates to the technology of password management, and more particularly, to a method and an apparatus for managing a super user password on a smart mobile terminal.

DESCRIPTION OF BACKGROUND ART

Root user is a conventional user name for users (i.e. super user) who have all privileges to access all documents and programs in Unix and Unix-like systems. Root user, similar to an Administrator on windows system, can configure the system arbitrarily. Therefore, the root user's login password (hereinafter referred to as super user password) is very important for security of the system.

At present, some mobile terminals with smart operating system (hereinafter referred to as smart mobile terminal) have already possessed a function of remote login service. After successfully remote logged into the smart mobile terminal, any operation can be executed to the smart mobile terminal. Therefore, it is especially important for this kind of smart mobile terminal to guarantee security of the super user password.

However, the super user password of some smart mobile terminals is a default uniform password. For example, the super user password of iPhone is a default string "alpine". This password has been well known and most users will not pay close attention to it, thus they will not change it. If an iPhone connects to Wi-Fi network or a computer, anyone might log into the iPhone via the default super user password and perform any operation on the iPhone after successful login, such as turning off and restarting the phone, uploading data in the iPhone, deleting all the documents in the iPhone, and even introducing Trojan horse virus, etc.

Therefore, it is very significant for assuring data security of the smart mobile terminal to change the default super user password of the smart mobile terminal.

BRIEF SUMMARY OF THE INVENTION

In view of aforesaid problem, the present invention is put forward to provide a method for managing a super user password on a smart mobile terminal and a corresponding apparatus for managing a super user password on a smart mobile terminal to overcome aforesaid problem or at least partly solve aforesaid problem.

According to one aspect of the present invention, a method for managing a super user password on a smart mobile terminal is provided, comprising: obtaining a super user password that is used currently by a smart mobile terminal; determining whether the super user password that is used currently is a default super user password of the smart mobile terminal; and if yes, prompting a user to change the super user password or automatically changing the super user password.

According to another aspect of the present invention, an apparatus for managing a super user password on a smart mobile terminal is provided, comprising: an obtaining unit configured to, obtain a super user password that is used currently by a smart mobile terminal; a determining unit configured to, determine whether the super user password that is used currently is a default super user password of the smart mobile terminal; a super user password management unit configured to, prompt a user to change the super user password or automatically change the super user password when the determining unit determines that the super user password that is used currently is a default super user password of the smart mobile terminal.

The method and the apparatus for managing a super user password on a smart mobile terminal of present invention provides the user with a scheme for changing the default super user password of the smart mobile terminal, and the change operation is simple and quick. The invention increases the user's attention on the super user password, effectively eliminates super user password security risk existing in the smart mobile terminal currently, and enhances security of smart mobile terminal user data.

Above description is only a summary of the technical scheme of the present invention. In order to show the technical means of the present invention more clearly so that it can be put into effect according to the content of the description, and to make the aforesaid and other purpose, features and advantages of the invention clearer, the embodiments of the invention are described in further detail with reference to the drawings.

BRIEF DESCRIPTION OF THE DRAWINGS

By reading the detailed description of the preferred embodiments below, various other advantages and benefits become clear for a person of ordinary skill in the art. The drawings are merely used for showing the preferred embodiments and are not intended to limit the present invention. And in the whole drawings, same reference signs are used for indicating same components. In the drawings.

DETAILED DESCRIPTION OF THE INVENTION

The embodiments of the present disclosure will be described in further detail with reference to the drawings below. Although the drawings show the embodiments of the present disclosure, it should be understood that the disclosure can be implemented in various forms and is not intended to be limited by the embodiments described here. On the contrary, the embodiments are provided to make the invention understood more thoroughly and completely convey the scope of the disclosure to a person skilled in the art.

In one embodiment: a method for managing a super user password on a smart mobile terminal. The method of the embodiment is described with reference to FIG. 1.

Figure 1:
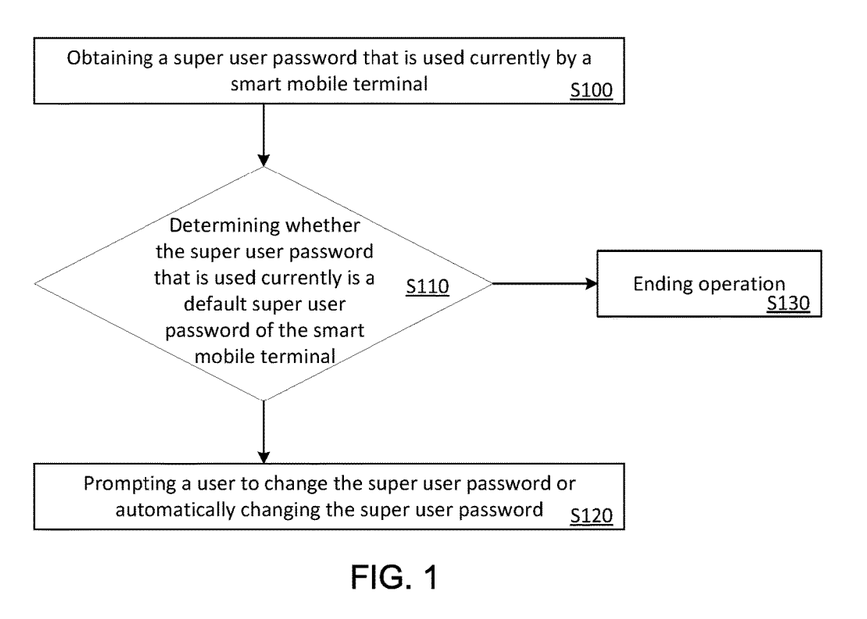
FIG. 1 is a flowchart of a method for managing a super user password on a smart mobile terminal according to Embodiment One of the present invention.

In FIG. 1, S100: obtaining a super user password that is used currently by a smart mobile terminal.

The embodiment does not define a time when the smart mobile terminal obtains a super user password that is used currently. The specific time when the smart mobile terminal obtains the super user password that is used currently can be a time when a user triggers a super user password management operation, or, a time when a user logs into a smart mobile terminal locally, or, a time when a user is detected to remote logins the smart mobile terminal, or a time when security vulnerability scanning of the smart mobile terminal is started. The embodiment merely enumerates several cases, but it is not confined to these cases.

Wherein for the case that the user triggers the super user password management operation, the embodiment provides an interface on the smart mobile terminal. The interface acts as an entrance for managing the super user password. A super user can send a super user password management command by clicking the interface, so that the smart mobile terminal enters into a state of super user password management. In the super user password management state, any management operations to the super user password can be implemented. The management operations to the super user password of the embodiment include, but are not limited to: changing the super user password, checking the super user password that is used currently, and detecting whether the super user password that is used currently is the latest super user password set by the super user.

The interface can be displayed at any location on a screen of the smart mobile terminal and can be moved at will. A specific example of the interface can be an icon of security management.

The embodiment, by providing an interface as the entrance for managing the super user password, can prompt the user to pay more attention to the super user password and manage the super user password at any time.

Wherein for the case that a user is detected to remote login the smart mobile terminal, the embodiment can intercept the remote login.

Specifically, the smart mobile terminal of the embodiment can read the super user password that is used currently from a local document that stores the super user password.

S110: determining whether the super user password that is used currently is a default super user password of the smart mobile terminal;

Each smart mobile terminal has a default super user password. Determining whether the super user password that is used currently is a default super user password of the smart mobile terminal of the embodiment comprises: comparing the default super user password of the smart mobile terminal with the obtained super user password that is used currently by the smart mobile terminal to determine whether they are the same, so as to determine whether the super user password that is used currently is the default super user password of the smart mobile terminal.

S120: if yes, prompting a user to change the super user password or automatically changing the super user password.

Specifically, when the embodiment determines that the super user password that is used currently is the default super user password of the smart mobile terminal, the user can be prompted to change the super user password. In one embodiment, prompting the user to change the super user password comprises:

prompting the user that risks exist in the super user password that is used currently and providing a super user password changing interface; receiving a command to change the super user password sent by the user via the super user password changing interface; providing a super user password changing box and receiving a changed super user password inputted in the changing box by the user; and substituting the changed super user password for the super user password that is used currently.

As a specific example, when the super user password that is used currently is determined to be the default super user password of the smart mobile terminal, the smart mobile terminal enters into the super user password management interface. The user can implement the management operations to the super user password on the super user password management interface, and can exit at any time to return to the home screen of the smart mobile terminal.

The super user password management interface of the embodiment comprises a user name and super user password area, a prompting area, and a super user password changing interface. The user can send the command to change the super user password by clicking the super user password changing interface.

The user name and super user password area displays a user name and the super user password that is used currently. The user can check the super user password that is used currently at any time through the user name and super user password area.

The prompting area is for displaying content that the user needs to be prompted. For example, if the super user password that is used currently is the default super user password of the smart mobile terminal "123456", the prompting content displayed in the prompting area is: the password used currently by the user is the default super user password, and it is better to change the password immediately. The specific prompting content can be defined at will. The embodiment only enumerates one case but is not limited to this.

Optionally, in the embodiment, after the changed super user password inputted by the user is substituted for the super user password that is used currently, the prompting area can prompt the user: the super user password is changed successfully, or when the changing failed, the user is prompted: fail to change the super user password.

The embodiment can send a prompt when the smart mobile terminal uses the default super user password, and thus effectively prompt the user to change the super user password timely to ensure security of user data in the smart mobile terminal. In addition, in the embodiment the user can directly input the changed super user password without need of input the original super user password when changing the super user password, and can simply and conveniently change the super user password directly on the smart mobile terminal, which simplify the operation of changing the super user password by the user.

As an example, automatically changing the super user password is: randomly generating a string and generating a new super user password by using the randomly generated string.

As another example, automatically changing the super user password is: taking a smart mobile terminal login password used by the user as the new super user password. For example, if a user needs to input a password "667788" when unlocking a screen of a mobile phone, then the password "667788" becomes the new super user password when automatically changing the super user password. That is to say, the super user password is changed to the same password as the login password of the mobile phone, which is convenient for the user to memory.

The embodiment saves the super user password changed by the user or the new super user password automatically changed locally via a bidirectional encryption algorithm. The embodiment does not define the specific bidirectional encryption algorithm, and any bidirectional encryption algorithm can be used.

In the embodiment, when the user logs into the smart mobile terminal locally, the super user password that is saved locally is displayed on the smart mobile terminal for the user. A specific example is that when the user enters into the super user password management interface, a plaintext of the locally saved super user password can be displayed in a super user password area and the user can conveniently check the super user password that is used currently through the super user password area.

It should be explained is that since the threat for the super user password on the smart mobile terminal is mainly from remote login, it is acceptable to display directly the plaintext of the super user password that is used currently on the smart mobile terminal.

S130: if not, ending the operation.

The embodiment does not specifically define the occasion of not being the default super user password of the smart mobile terminal. It means that the default super user password of the smart mobile terminal has been changed and the user can further change it as needed.

As can be known from the description of the embodiment above, the present embodiment provides a user with a scheme for changing a default super user password of a smart mobile terminal, and this operation is simple and quick. The embodiment increases the user's attention on the super user password, effectively eliminates super user password security risk existing on the smart mobile terminal currently, and enhances security of smart mobile terminal user data.

The method for managing a super user password on a smart mobile terminal of the embodiment can be applied to the smart mobile terminal with remote login service function.

In another embodiment: taking changing the super user password of iPhone as an example, iPhone is provided with a security management icon. When a user clicks the security management icon, the iPhone will acquire a super user password that is used currently and then enter into a super user password management interface.

iPhone saves users' basic information in a file /etc/master.passwd, which is a text file and each line in the file consists of seven fields separated by colons, respectively representing:

Login name: encrypted password: digital user ID: blockette ID: annotation field: home directory: user shell program Part content of a typical /etc/master.passwd file is as follows:

nobody:*:−2:−2::0:0:Unprivileged User:/var/empty:/usr/bin/false root:6Ur5VUvNsXAPA:0:0::0:0: System Administrator:/var/root:/bin/sh mobile:/smx7MYTQIi2M:501:501::0:0:Mobile User:/var/mobile:/bin/sh daemon:*:1:1::0:0:System Services:/var/root:/usr/bin/false ftp:*:98:−2::0:0:FTP Daemon:/var/empty:/usr/bin/false networkd:*:24:24::0:0:Network Services:/var/empty:/usr/bin/false wireless:*:25:25::0:0:Wireless Services:/var/wireless/usr/bin/false

. . .

Wherein, if the "encrypted password" field contains only one *, it indicates that the user name is valid but cannot login. If the "encrypted password" is a string, it represents a ciphertext of encrypted original password. Thus the encrypted password until the line that the login name is root is the ciphertext of the encrypted super user password that is used currently.

The ciphertext of the super user password that is used currently is obtained from the line that the login name is root in the /etc/master.passwd file. The default super user password "alpine" of iPhone is inputted in the super user password management interface, and a system function crypt is invoked, and then the ciphertext of the default super user password will be generated. The ciphertext of the super user password is compared with the ciphertext of the obtained super user password that is used currently, if they are the same, then it is determined that the super user password that is used currently by the smart mobile terminal is the default super user password "alpine".

The super user password management interface shows:

User name: super user;

Super user password: alpine; and

Prompting area: the password used currently is default super user password, and it is better to change the password immediately.

The super user password management interface further comprises a super user password changing interface. After the user clicks the super user password changing interface, iPhone provides a super user password changing box. The user inputs the changed super user password 654321 into the changing box. After the user inputs the changed super user password 654321, the system function crypt is invoked to introduce the changed super user password and two randomly generated strings and then to obtain a new ciphertext string. When the new ciphertext string substitutes for the ciphertext of the original encrypted password in the line that the login name is root, changing the super user password is completed. At the same time, the changed super user password is saved locally in the iPhone via bidirectional encryption algorithm.

As can be known from the description above, when the present embodiment of the invention knows that the iPhone uses the default super user password, it can prompt the user to change the super user password, which enhances the user's vigilance for the super user password. And the user can conveniently and quickly change the super user password, which effectively ensures the security of the user data in iPhone.

Embodiment three: an apparatus for managing a super user password on a smart mobile terminal. The apparatus is described in detail with reference to FIG. 2.

Figure 2:
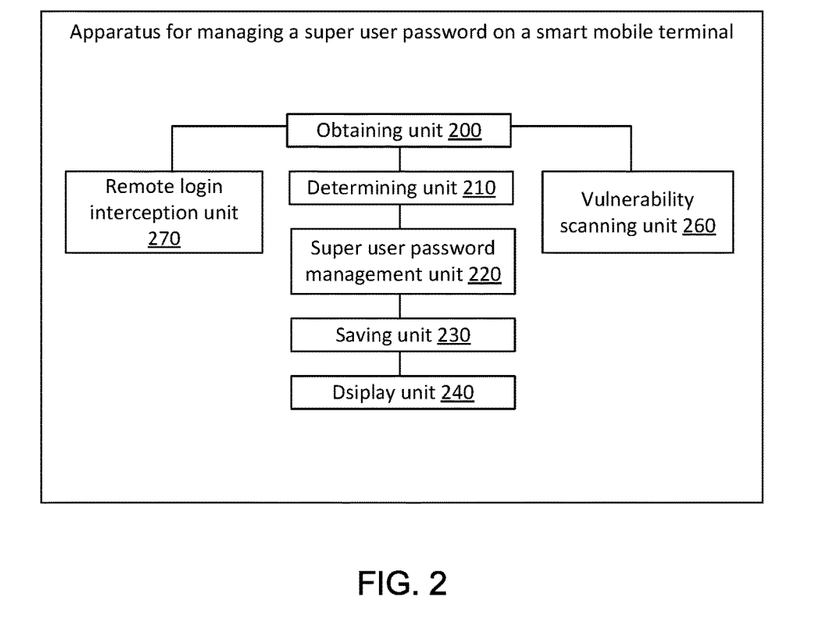
FIG. 2 is a schematic view of an apparatus for managing a super user password on a smart mobile terminal according to Embodiment Three of the present invention.

The apparatus shown in FIG. 2 is provided in a smart mobile terminal with remote login service function, mainly comprising: an obtaining unit 200, a determining unit 210, a super user password management unit 220, a saving unit 230, a display unit 240, a remote login interception unit 250, and a vulnerability scanning unit 260. Wherein, the obtaining unit 200 is connected to the determining unit 210, the remote login interception unit 250 and the vulnerability scanning unit 260; the super user password management unit 220 is connected to the determining unit 210.

Wherein, the obtaining unit 200 is mainly configured to obtain a super user password that is used currently by a smart mobile terminal;

The embodiment does not define a time when the obtaining unit 200 obtains a super user password that is used currently. The specific time when the obtaining unit 200 obtains the super user password that is used currently can be a time when a user triggers a super user password management operation, or a time when a user logs into a smart mobile terminal locally, or a time when a user is detected to remote logins the smart mobile terminal by the remote login interception unit 250, or a time when the vulnerability scanning unit 260 starts security vulnerability scanning of the smart mobile terminal. The embodiment merely enumerates several cases, but it is not confined to these cases. Wherein, the remote login interception unit 250 is mainly configured to, when a user is detected to remote login the smart mobile terminal, intercept the remote login and inform the obtaining unit 200, so that when the smart mobile terminal uses the default super user password, the default super user password can be changed. The vulnerability scanning unit 260 is mainly configured to start a security vulnerability scanning operation of the smart mobile terminal to trigger the obtaining unit 200 to implement the operation of obtaining the super user password that is used currently, so that when the smart mobile terminal uses the default super user password, the default super user password can be changed.

Wherein for the case that the user triggers the super user password management operation, the embodiment provides an interface on the smart mobile terminal. The interface acts as an entrance for managing the super user password. The super user can send a super user password management command by clicking the interface, so that the smart mobile terminal enters into a state of super user password management. In the super user password management state, any management operations to the super user password can be implemented. The management operations to the super user password of the embodiment include, but are not limited to, changing the super user password, checking the super user password that is used currently, and detecting whether the super user password that is used currently is the latest super user password set by the super user. The interface can be displayed at any location on a screen of the smart mobile terminal and can be moved at will. A specific example of the interface can be an icon of security management. The embodiment, by providing an interface as the entrance for managing the super user password, can prompt the user to pay more attention to the super user password and manage the super user password at any time.

Specifically, the obtaining unit 200 of the embodiment can read the super user password that is used currently from a local document that stores the super user password.

Wherein the determining unit 210 is mainly configured to determine whether the super user password that is used currently is a default super user password of the smart mobile terminal;

Each smart mobile terminal has a default super user password. The determining unit 210 of the embodiment determining whether the super user password that is used currently is a default super user password of the smart mobile terminal comprises: comparing the default super user password of the smart mobile terminal with the obtained super user password that is used currently by the smart mobile terminal to determine whether they are the same, so as to determine whether the super user password that is used currently is the default super user password of the smart mobile terminal.

Wherein the super user password management unit 220 is mainly configured to prompt a user to change the super user password or automatically change the super user password when the determining unit 210 determines that the super user password that is used currently is a default super user password of the smart mobile terminal.

Wherein, the super user password management unit 220 of an embodiment comprises: a prompting subunit 2210, a first receiving subunit 2220, a second receiving subunit 2230 and a changing subunit 2240.

Wherein the prompting subunit 2210 is mainly configured to prompt the user that risks exist in the super user password that is used currently;

The first receiving subunit 2220 is mainly configured to provide a super user password changing interface and receive a command to change the super user password from the user via the super user password changing interface;

The second receiving subunit 2230 is mainly configured to provide a super user password changing box and receive a changed super user password inputted in the changing box by the user;

The changing subunit 2240 is mainly configured to obtain the changed super user password from the second receiving subunit 2230 and substitutes the changed super user password for the super user password that is used currently.

As a specific example, when the super user password that is used currently is determined to be the default super user password of the smart mobile terminal, the smart mobile terminal enters into the super user password management interface. The user can implement the management operations to the super user password on the super user password management interface, and can exit at any time to return to the home screen of the smart mobile terminal.

In an embodiment, the super user password management interface comprises a user name and super user password area for displaying the user name and the super user password that is used currently. The user can check the super user password that is used currently at any time through the user name and super user password area.

The super user password management interface further comprises a prompting area for displaying the content that the prompting subunit 2210 prompts the user. When the determining unit 210 determines that the super user password that is used currently is the default super user password of the smart mobile terminal, the content prompted in the prompting area determined by the prompting subunit 2210 is: the password used currently by the user is the default super user password and it is better to change the password immediately. The specific prompting content can be defined at will. The embodiment only enumerates one case but is not limited to this.

The first receiving subunit 2220 provides the super user password changing interface that is displayed on the super user password management interface and receives the command to change the super user password from the user via the super user password changing interface; after receiving the command to change the super user password, the second receiving subunit 2230 provides the super user password changing box and receives the changed super user password inputted in the changing box by the user; and then the changing subunit 2240 obtains the changed super user password from the second receiving subunit 2230 and substitutes the changed super user password for the super user password that is used currently.

Optionally, in the embodiment after the changing subunit 2240 substitutes the changed super user password for the super user password that is used currently, the prompting subunit 2210 can determine that the content for prompting the user in the prompting area is: the super user password is changed successfully; or when the changing is failed, the user is prompted: fail to change the super user password.

Wherein, the super user password management unit 220 of another embodiment comprises:

a super user password generation subunit 2250, mainly configured to randomly generate a string and generate new super user password by using the string or take a smart mobile terminal login password used by the user as the new super user password. For example, if a user needs to input a password "667788" when unlocking a screen of a mobile phone, then the password "667788" becomes the new super user password when automatically changing the super user password. That is to say, the super user password is changed to the same password as the login password of the mobile phone, which is convenient for the user to memory.

Wherein the saving unit 230 is mainly configured to save the super user password changed by the user or the new super user password generated when automatically changing the super user password locally via a bidirectional encryption algorithm. The embodiment does not define the specific bidirectional encryption algorithm, and any bidirectional encryption algorithm can be used.

Wherein the display unit 240 is mainly configured to display the super user password saved locally on the smart mobile terminal for the user of the smart mobile terminal when the user logs into the smart mobile terminal locally.

As a specific example, after the user enters into the super user password management interface, a plaintext of the locally saved super user password can be displayed in the super user password area. The user can conveniently check the super user password that is used currently through the super user password area. It should be explained that since the threat for the super user password on the smart mobile terminal is mainly from remote login, it is acceptable to display directly the plaintext of the super user password that is used currently on the smart mobile terminal.

The embodiment can send a prompt when the smart mobile terminal uses the default super user password, and thus effectively prompt the user to change the super user password timely to ensure security of user data in the smart mobile terminal.

In addition, when someone remote logins the smart mobile terminal the embodiment can intercept the telnet and locally trigger changing the default super user password. And when the smart mobile terminal starts security vulnerability scanning the embodiment can trigger changing the default super user password. Both of the above operations effectively protect the security of user data in the smart mobile terminal.

At the same time, the user can directly input the changed super user password without need of the original super user password when changing the super user password, and can simply and conveniently change the super user password directly on the smart mobile terminal, which simplify the operation of the user changing the super user password.

The method and apparatus for managing a super user password on a smart mobile terminal of the invention provides users with a friendly interface for managing the super user password, so that the users can simply and conveniently change the super user password directly on the smart mobile terminal; the super user password can be directly changed without need of inputting the original super user password when changing the super user password, thus the operation is simple and quick. And it is convenient for the users to manage the super user password and makes users pay more attention to the super user password, thus effectively enhances data security of the smart mobile terminal.

The algorithm and display provided here are not inherently related to any particular computer, virtual system or other device. Various general-purpose systems can also be used together with the teaching based thereon. According to the above description, the structure required to construct this kind of system is obvious. In addition, the present invention is not directed to any particular programming language. It is to be understood, that the contents of the present invention described here can be implemented by using various programming languages, and the description above made for a particular language is for the purpose of disclosure of the preferred embodiment of the present invention.

A large number of specific details are described in the specification provided herein. However, it can be understood, that the embodiments of the present invention can be implemented without these specific details. In some instances, the methods, structures and techniques that are well known are not showed in detail, so as not to obscure the understanding of this specification.

Similarly, it is to be understood, that to simplify the disclosure and help to understand one or more of respective inventive aspects, in the above description of the exemplary embodiments of the present invention, respective features of the present invention sometimes are together grouped into a single embodiment, drawings or the description therefore. However, the disclosed method shall not be construed as reflecting an intention that the present invention which is sought for protection requires more features than those explicitly recorded in each claim. More specifically, as reflected in the following claims, inventive aspects lie in that they are less than all features of a single embodiment disclosed previously. Therefore, claims following the specific embodiment are hereby explicitly incorporated in this specific embodiment, wherein each claim itself serves as a separate embodiment of the present invention.

It can be understood by those skilled in the art that, the modules in the device in an embodiment can be adaptively changed and provided in one or more devices different from the embodiment. The modules or units or components in an embodiment can be combined to one module or unit or component, and further they can be divided into a plurality of sub modules or subunits or subcomponents. Except that at least some of such features and/or procedures or units are mutually exclusive, any combination can be used to combine all features disclosed in the present specification (including the accompanying claims, abstract and drawings) and any method so disclosed or all procedures or units of the device. Unless otherwise explicitly stated, every feature disclosed in the present specification (including the accompanying claims, abstract and drawings) can be replaced by alternative features providing the same, equivalent or similar purpose.

Furthermore, it can be understood by those skilled in the art that, although some embodiments described herein include certain features included in other embodiments rather than other features, the combination of the features of the different embodiments means being within the scope of the present invention and form different embodiments. For example, in the following claims, any one of the embodiments sought for protection can be used in any combination.

The respective components of the embodiments of the present invention can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in the virus protection device in the electronic device according to the embodiments of the present invention. The present invention can also be implemented as a device or device program (e.g., a computer program and a computer program product) for executing some of all of the method described here. Such a program for implementing the present invention can be stored on a computer readable medium or can have a form of one or more signal. Such a signal can be downloaded from an Internet website or provided on a carrier signal or provided in any other form.

Figure 3:
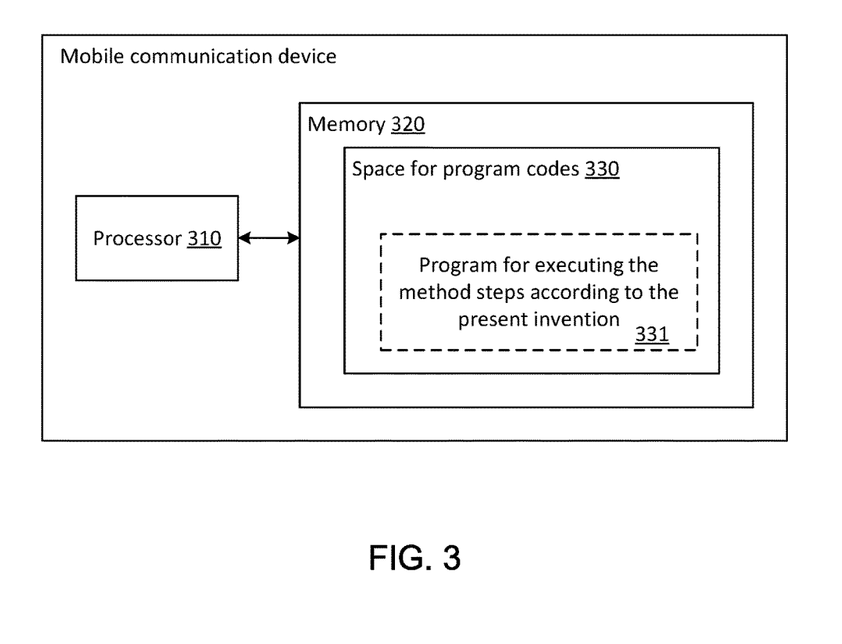
FIG. 3 is a block diagram of a mobile communication device for implementing a method of the present invention.
Figure 4:
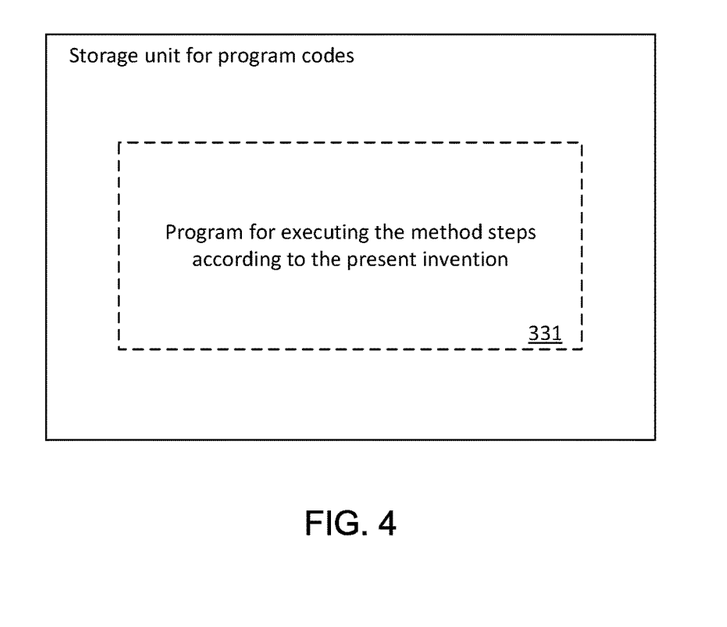
FIG. 4 is a schematic view of a storage unit for maintaining or carrying program codes for achieving a method according to the invention.

For example, FIG. 3 shows a mobile communication device for executing the method for managing a super user password on a smart mobile terminal according to the invention. The mobile communication device traditionally comprises a processor 310 and a computer program product or a computer readable medium in the form of storage 320. The storage 320 can be electronic storage such as flash memory, EEPROM (Electrically Erasable Programmable Read Only Memory), an EPROM, a hard disk or a ROM or the like. The memory 320 has a storage space 330 for program codes 331 for executing any method steps in the above method. For example, the storage space 330 for the program codes can include the respective program codes 331 for respectively implementing various steps in the above method. These program codes can be read out from or written into one or more computer program products. These computer program products include program code carriers such as a hard disk, a compact disk (CD), a memory card or a floppy disk. Such computer program products are generally portable or fixed storage units as described with reference to FIG. 4. The storage units can have storage sections or storage spaces, etc. arranged similar to those of the memory 320 in the mobile communication device of FIG. 3. The program codes can be compressed for example in a suitable format. Generally, the storage units include the program 331' for executing the method steps according the present invention, that is, codes that can be read by a processor for example such as 310. When these codes are run by the mobile communication device, the mobile communication device is caused to execute respective steps in the above described method.

It should be noted that, the above described embodiments are used for explaining the present invention, rather than limiting the present invention, and an alternative embodiment can be designed by those skilled in the art without departing from the scope of the appended claims. In the claims, any reference symbol positioned between parentheses should not be considered the limiting of the claims. The word "include" does not exclude the existence of a element or a step that is not described in the claims. The word "a" or "an" positioned before an element does not exclude the existence of a plurality of such element. The present invention can be implemented by way of a hardware including several different elements and by way of a computer suitably programmed. In a unit claim enumerating several devices, several of these devices can be specifically implemented by the same hardware. The use of the word "first", "second" and "third", etc. does not represent any sequence. These words can be construed as a name.

The invention claimed is:

1. A method for managing a super user password on a smart mobile terminal, comprising:
   obtaining, by an obtaining unit associated with the smart mobile terminal from a document local to the smart mobile terminal, a super user password that is used currently by the smart mobile terminal, wherein the super user is a root user having privileges to access all documents and programs of the smart mobile terminal and the super user password is the root user's login password;
   detecting, by a remote login interception unit, a remote login to the smart mobile terminal, wherein detecting the remote login to the smart mobile terminal triggers determining, by a determining unit associated with the smart mobile terminal, whether the super user password that is used currently is a default super user password of the smart mobile terminal;
   scanning, by a vulnerability scanning unit, for a security vulnerability of the smart mobile terminal, wherein scanning for the security vulnerability of the smart mobile terminal trigger determining, by the determining unit associated with the smart mobile terminal, whether the super user password that is used currently is the default super user password of the smart mobile terminal; and
   responsive to a determination that the super user password that is used currently is the default super user password of the smart mobile terminal, prompting, by a super user password management unit associated with the smart mobile terminal via a display-based interface, a user to change the super user password or automatically changing the super user password.

2. The method according to claim 1, wherein, the prompting a user to change the super user password comprises:
   prompting the user that risks exist in the super user password that is used currently and providing a super user password changing option via the display-based interface;
   receiving a command to change the super user password sent by the user via the interface;
   providing a super user password changing box and receiving a changed super user password inputted in the changing box by the user; and
   substituting the changed super user password for the super user password that is used currently.

3. The method according to claim 1, wherein automatically changing the super user password comprises:
   randomly generating a string and generating a new super user password by using the string.

4. The method according to claim 3, further comprising:
   saving the changed super user password or the new super user password locally via a bidirectional encryption algorithm.

5. The method according to claim 1, wherein automatically changing the super user password comprises:
   taking a smart mobile terminal login password used by the user as a new super user password.

6. The method according to claim 1, further comprising:
   before obtaining the super user password that is used currently by the smart mobile terminal, detecting a remote user login to the smart user terminal; and
   intercepting the remote user login.

7. The method according to claim 1, wherein before obtaining the super user password that is used currently by the smart mobile terminal, further comprising:
   starting a security vulnerability scanning of the smart mobile terminal.

8. The method according to claim 1, further comprising:
   when the user logs into the smart mobile terminal locally, displaying the super user password that is saved locally for the user on the smart mobile terminal.

9. The method according to claim 1, wherein determining whether the super user password that is used currently is the default super user password of the smart mobile terminal comprises comparing the obtained super user password that is used currently by the smart mobile terminal to the default super user password of the smart mobile terminal.

10. An apparatus for managing a super user password on a smart mobile terminal, comprising a memory stored computer-executable instructions therein and at least one processor to execute the instructions to cause:

obtaining, by an obtaining unit associated with the smart mobile terminal from a document local to the smart mobile terminal, a super user password that is used currently by a smart mobile terminal, wherein the super user is a root user having privileges to access all documents and programs of the smart mobile terminal and the super user password is the root user's login password;

detecting, by a remote login interception unit, a remote login to the smart mobile terminal, wherein detecting the remote login to the smart mobile terminal triggers determining, by a determining unit associated with the smart mobile terminal, whether the super user password that is used currently is a default super user password of the smart mobile terminal;

scanning, by a vulnerability scanning unit, for a security vulnerability of the smart mobile terminal, wherein scanning for the security vulnerability of the smart mobile terminal trigger determining, by the determining unit associated with the smart mobile terminal, whether the super user password that is used currently is the default super user password of the smart mobile terminal; and responsive to a determination that the super user password that is used currently is the default super user password of the smart mobile terminal, prompting, by a super user password management unit associated with the smart mobile terminal via a display-based interface, a user to change the super user password that is used currently or automatically changing the super user password that is used currently when determining that the super user password is the default super user password of the smart mobile terminal.

11. The apparatus of claim 10, wherein the prompting a user to change the super user password that is used currently or automatically changing the super user password that is used currently comprises:

prompting the user that risks exist in the super user password that is used currently;

receiving a command to change the super user password from the user via the interface;

providing a super user password changing box and receiving a changed super user password inputted in the changing box by the user via the changing box; and obtaining the changed super user password and substituting the changed super user password for the super user password that is used currently.

12. The apparatus of claim 11, wherein the apparatus further comprises:

saving the changed super user password or the new super user password locally via a bidirectional encryption algorithm.

13. The apparatus of claim 10, wherein the prompting a user to change the super user password that is used currently or automatically changing the super user password that is used currently comprises:

randomly generating a string and generating a new super user password by using the string or taking a smart mobile terminal login password used by the user as the new super user password.

14. The apparatus of claim 10, wherein the processor further executes the instructions to cause:

displaying the super user password that is saved locally for the user of the smart mobile terminal on the smart mobile terminal when the user logs into the smart mobile terminal locally.

15. The apparatus of claim 10, processor further executes the instructions to cause:

when a user is detected to remote logins the smart mobile terminal, intercepting the remote login and informing the obtaining unit.

16. The apparatus of claim 10, further comprising:

starting a security vulnerability scanning of the smart mobile terminal.

17. A non-transitory computer readable medium in which having instructions stored therein that, when executed by at least one processor, cause the processor to perform operations for managing a super user password on a smart mobile terminal, which comprising:

obtaining, by an obtaining unit associated with the smart mobile terminal from a document local to the smart mobile terminal, a super user password that is used currently by a smart mobile terminal, wherein the super user is a root user having privileges to access all documents and programs of the smart mobile terminal and the super user password is the root user's login password;

detecting, by a remote login interception unit, a remote login to the smart mobile terminal, wherein detecting the remote login to the smart mobile terminal triggers determining, by a determining unit associated with the smart mobile terminal, whether the super user password that is used currently is a default super user password of the smart mobile terminal;

scanning, by a vulnerability scanning unit, for a security vulnerability of the smart mobile terminal, wherein scanning for the security vulnerability of the smart mobile terminal trigger determining, by the determining unit associated with the smart mobile terminal, whether the super user password that is used currently is the default super user password of the smart mobile terminal; and responsive to a determination that the super user password that is used currently is the default super user password of the smart mobile terminal, prompting, by a super user password management unit associated with the smart mobile terminal via a display-based interface, a user to change the super user password or automatically changing the super user password.

* * * * *